(12) United States Patent
Liu (10) Patent No.: US 8,556,144 B2
(45) Date of Patent: Oct. 15, 2013

(54) MULTI-PURPOSE CARRYING DEVICE FOR CAR

(76) Inventor: Yao-Huang Liu, Tainan (TW)

( * ) Notice: Subject to any disclaimer, the term of this patent is extended or adjusted under 35 U.S.C. 154(b) by 11 days.

(21) Appl. No.: 13/418,417

(22) Filed: Mar. 13, 2012

(65) Prior Publication Data

US 2013/0240586 A1    Sep. 19, 2013

(51) Int. Cl.
*B60R 9/08* (2006.01)
*B60R 9/10* (2006.01)

(52) U.S. Cl.
USPC ........... 224/497; 224/506; 224/510; 224/519; 224/532; 224/924

(58) Field of Classification Search
USPC ......... 224/488, 497, 506, 509, 532, 924, 310, 224/521, 504, 505, 507, 508, 510, 531, 224/519; D12/407, 408
See application file for complete search history.

(56) References Cited

U.S. PATENT DOCUMENTS

| | | | | |
|---|---|---|---|---|
| 4,630,990 A * | 12/1986 | Whiting | | 414/462 |
| 5,372,287 A * | 12/1994 | Deguevara | | 224/510 |
| 5,884,930 A * | 3/1999 | Cluth | | 280/497 |
| 6,179,184 B1 * | 1/2001 | Belinky et al. | | 224/510 |
| 6,237,824 B1 * | 5/2001 | Bagley | | 224/521 |
| 7,419,076 B1 * | 9/2008 | Grothues | | 224/519 |
| 7,766,202 B2 * | 8/2010 | Depot | | 224/504 |
| 7,861,903 B2 * | 1/2011 | Plaschka | | 224/402 |
| 8,028,874 B2 * | 10/2011 | Stiles | | 224/310 |
| 8,070,028 B2 * | 12/2011 | Segeren et al. | | 224/402 |
| 2007/0108246 A1* | 5/2007 | Jennings et al. | | 224/521 |
| 2010/0096424 A1* | 4/2010 | Kuschmeader et al. | | 224/509 |
| 2012/0098235 A1* | 4/2012 | DeMers et al. | | 280/504 |

* cited by examiner

*Primary Examiner* — Justin Larson
(74) *Attorney, Agent, or Firm* — Alan Kamrath; Kamrath IP Lawfirm, P.A.

(57) ABSTRACT

A carrying device (3) includes a first support rack (30), a second support rack (32) pivotally connected with the first support rack, and a connecting member (31) secured on the first support rack and pivotally connected with the second support rack to connect the first support rack and the second support rack. Thus, the first support rack is used to carry an elongate object (9), such as a surf board, a boat, a ladder and the like, and the second support rack is used to carry a bicycle (8).

7 Claims, 11 Drawing Sheets

MULTI-PURPOSE CARRYING DEVICE FOR CAR

BACKGROUND OF THE INVENTION

1. Field of the Invention

The present invention relates to a carrying device and, more particularly, to a carrying device for a car.

2. Description of the Related Art

Figure 10:
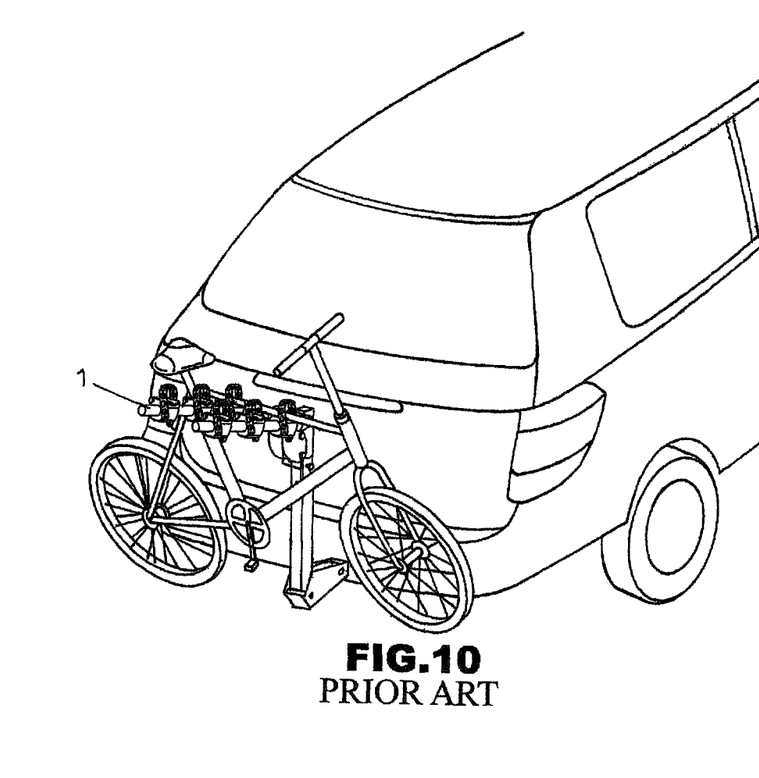
FIG. 10 is a perspective view of a first conventional carrying device in accordance with the prior art.

A first conventional carrying device 1 in accordance with the prior art shown in FIG. 10 is mounted on a car for carrying a bicycle. However, the first conventional carrying device 1 is only used for carrying a bicycle, thereby limiting the versatility of the first conventional carrying device 1.

Figure 11:
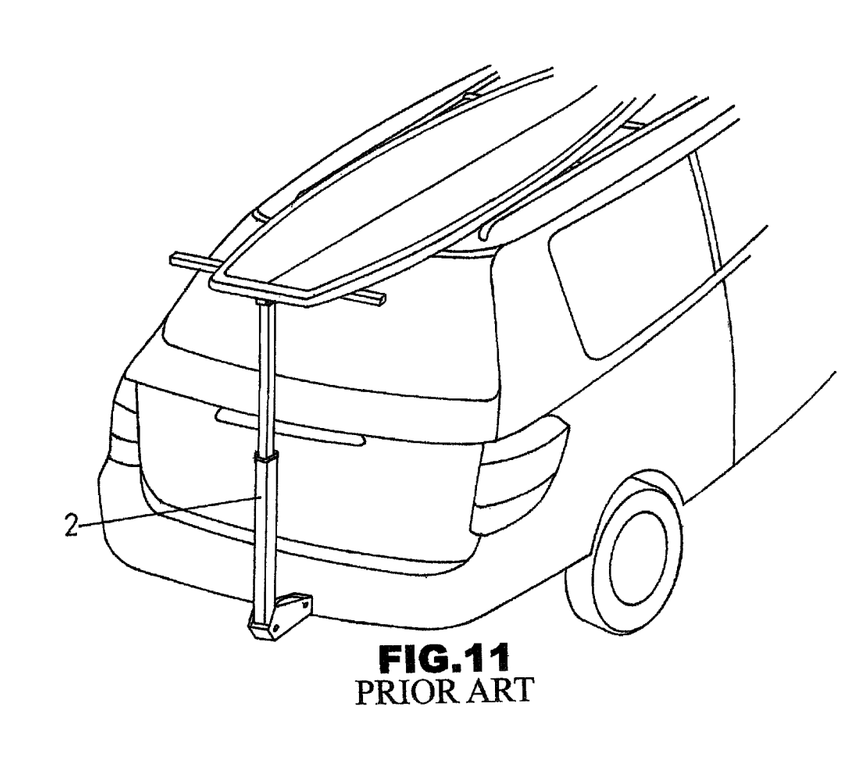
FIG. 11 is a perspective view of a second conventional carrying device in accordance with the prior art.

A second conventional carrying device 2 in accordance with the prior art shown in FIG. 11 is mounted on a car for carrying an elongate object, such as a surf board, a boat, a ladder and the like. However, the second conventional carrying device 2 is only used for carrying an elongate object, thereby limiting the versatility of the second conventional carrying device 2.

BRIEF SUMMARY OF THE INVENTION

In accordance with the present invention, there is provided a carrying device, comprising a first support rack and a second support rack pivotally connected with the first support rack. The first support rack includes an outer tube, an inner tube retractably mounted in the outer tube, and an adjusting pin extended through the outer tube and adjustably locked onto the inner tube. The second support rack includes a support bar, and at least one linking member mounted on the support bar.

The carrying device further comprises a connecting member secured on the first support rack and pivotally connected with the second support rack to connect the first support rack and the second support rack. The connecting member is secured on the outer tube of the first support rack. The linking member of the second support rack is pivotally mounted on the connecting member.

The second support rack further includes a pivot bolt extended through the linking member of the second support rack and the connecting member so that the linking member of the second support rack is pivotally connected with the connecting member, and a positioning pin extended through the linking member of the second support rack and the connecting member so that the linking member of the second support rack is positioned on the connecting member by the pivot bolt and the positioning pin to lock the second support rack onto the connecting member.

Alternatively, the linking member of the second support rack is directly mounted on the outer tube of the first support rack. The second support rack further includes a pivot bolt extended through the linking member of the second support rack, the outer tube of the first support rack and the inner tube of the first support rack so that the linking member of the second support rack is pivotally connected with the outer tube of the first support rack, and a positioning pin extended through the linking member of the second support rack, the outer tube of the first support rack and the inner tube of the first support rack so that the linking member of the second support rack is positioned on the outer tube of the first support rack by the pivot bolt and the positioning pin to lock the second support rack onto the first support rack.

The primary objective of the present invention is to provide a multi-purpose carrying device for carrying at least two objects.

According to the primary advantage of the present invention, the first support rack is used to carry an elongate object, such as a surf board, a boat, a ladder and the like, and the second support rack is used to carry a bicycle, thereby enhancing the versatility of the carrying device.

Further benefits and advantages of the present invention will become apparent after a careful reading of the detailed description with appropriate reference to the accompanying drawings.

DETAILED DESCRIPTION OF THE INVENTION

Figure 1:
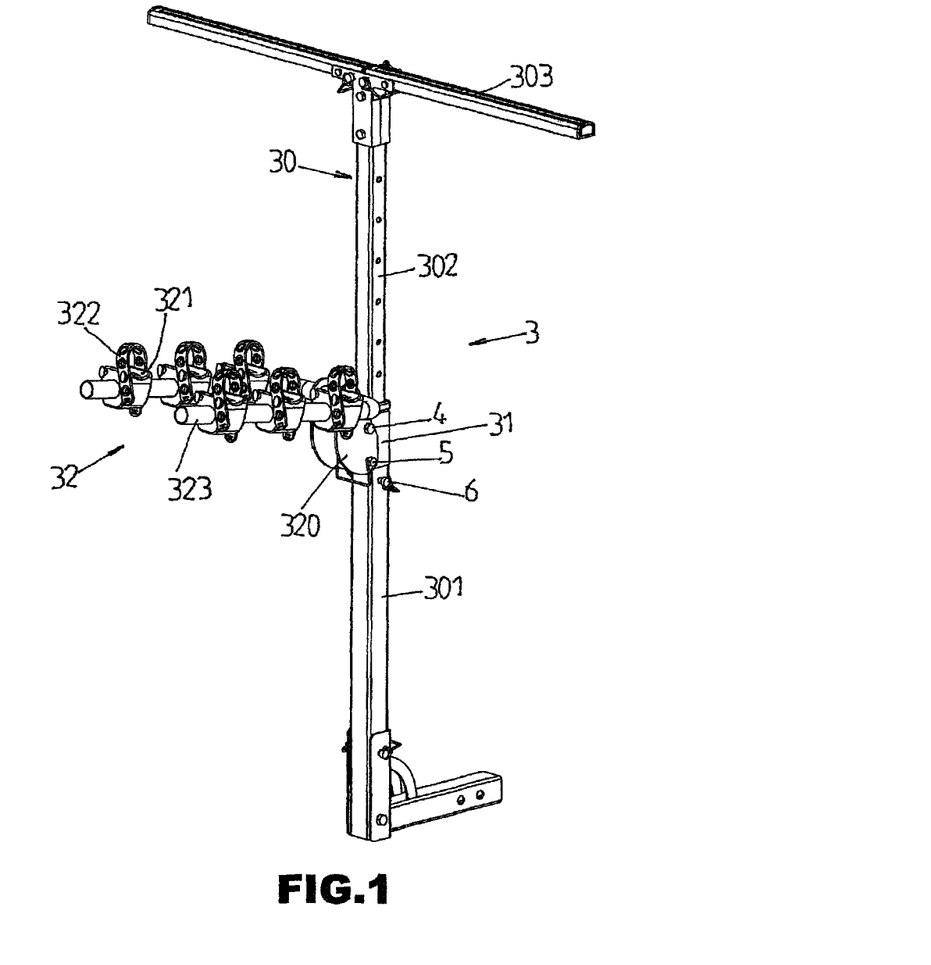
FIG. 1 is a perspective view of a carrying device in accordance with the preferred embodiment of the present invention.
Figure 2:
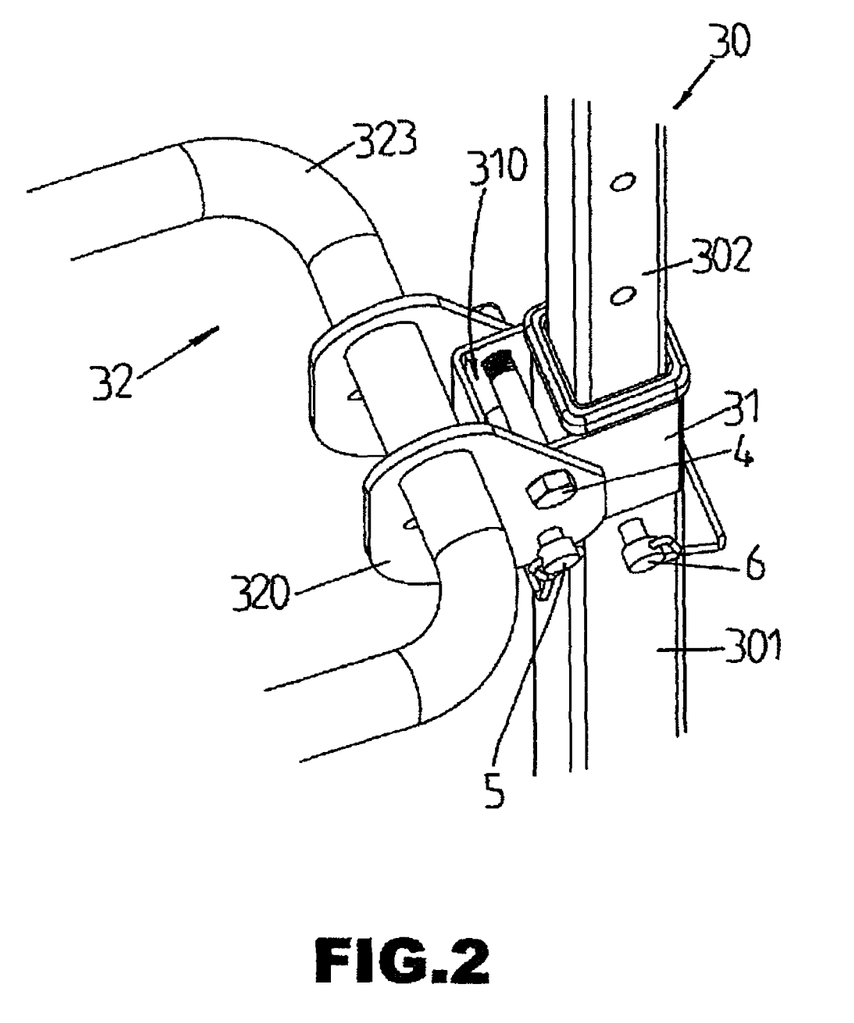
FIG. 2 is a partially perspective view of the carrying device as shown in FIG. 1.
Figure 3:
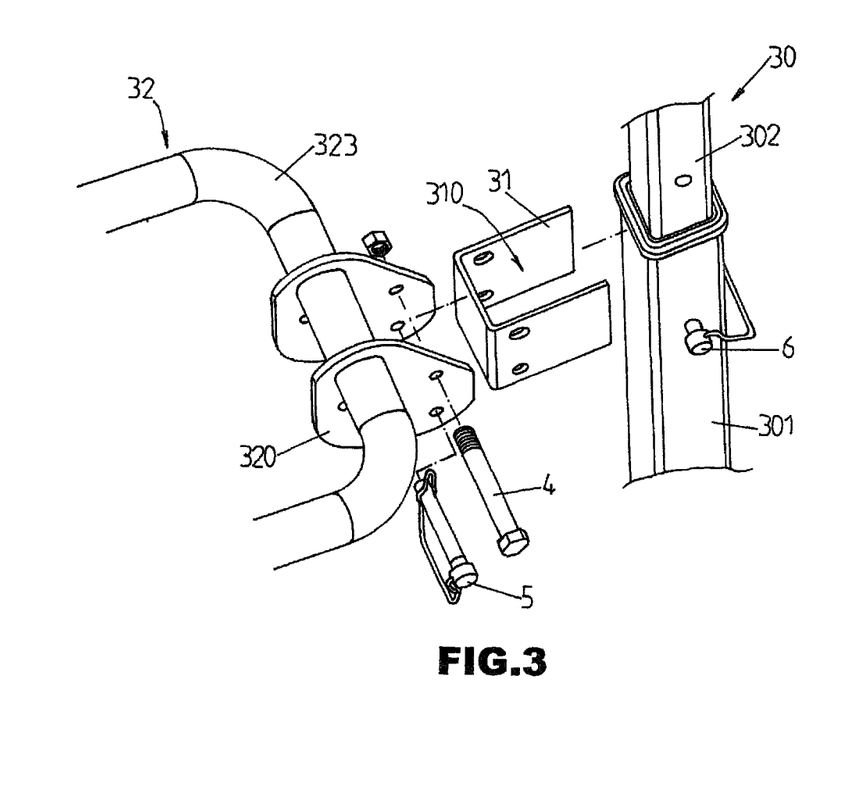
FIG. 3 is an exploded perspective view of the carrying device as shown in FIG. 2.

Referring to the drawings and initially to FIGS. 1-3, a carrying device 3 in accordance with the preferred embodiment of the present invention comprises a first support rack 30 and a second support rack 32 pivotally connected with the first support rack 30.

The first support rack 30 includes an outer tube 301, an inner tube 302 retractably mounted in the outer tube 301, an adjusting pin 6 extended through the outer tube 301 and adjustably locked onto the inner tube 302 to adjustably lock the inner tube 302 onto the outer tube 301, a transverse bar 303 pivotally and foldably mounted on a top of the inner tube 302, and a fixing cord 304 (see FIG. 4) mounted on the transverse bar 303.

The second support rack 32 includes a support bar 323, at least one linking member 320 mounted on the support bar 323, a plurality of mounting brackets 321 mounted on the support bar 323, and a plurality of fastening straps 322 mounted on the support bar 323 and aligning and co-operating with the mounting brackets 321 respectively. In the preferred embodiment of the present invention, the second support rack 32 includes two spaced linking members 320 each secured mounted on the support bar 323.

The carrying device 3 further comprises a connecting member 31 secured on the first support rack 30 and pivotally connected with the second support rack 32 to connect the first support rack 30 and the second support rack 32. The connecting member 31 has a substantially U-shaped profile and has two opposite sides abutting two opposite sides of a top of the outer tube 301 of the first support rack 30. The connecting member 31 is secured on the outer tube 301 of the first support rack 30 and has an interior provided with a space 310 which is confined between the connecting member 31 and the outer tube 301 of the first support rack 30.

The linking member 320 of the second support rack 32 is pivotally mounted on the connecting member 31. The second support rack 32 further includes a pivot bolt 4 extended through the linking member 320 of the second support rack 32 and the connecting member 31 so that the linking member 320 of the second support rack 32 is pivotally connected with the connecting member 31, and a positioning pin 5 extended through the linking member 320 of the second support rack 32 and the connecting member 31 so that the linking member 320 of the second support rack 32 is positioned on the connecting member 31 by the pivot bolt 4 and the positioning pin 5 to lock the second support rack 32 onto the connecting member 31. The pivot bolt 4 passes through the space 310 of the connecting member 31. The positioning pin 5 passes through the space 310 of the connecting member 31.

In practice, after the positioning pin 5 is detached from the connecting member 31 and the linking member 320 of the second support rack 32, the linking member 320 of the second support rack 32 is released from the positioning pin 5 and is pivotable about the pivot bolt 4 so that the second support rack 32 is unlocked from and pivotable relative to the connecting member 31 to adjust the position of the second support rack 32 relative to the first support rack 30. In addition, after the adjusting pin 6 is detached from the outer tube 301 and the inner tube 302, the inner tube 302 is unlocked from the adjusting pin 6 and is movable relative to the outer tube 301 to adjust the position of the inner tube 302 relative to the outer tube 301.

Figure 4:
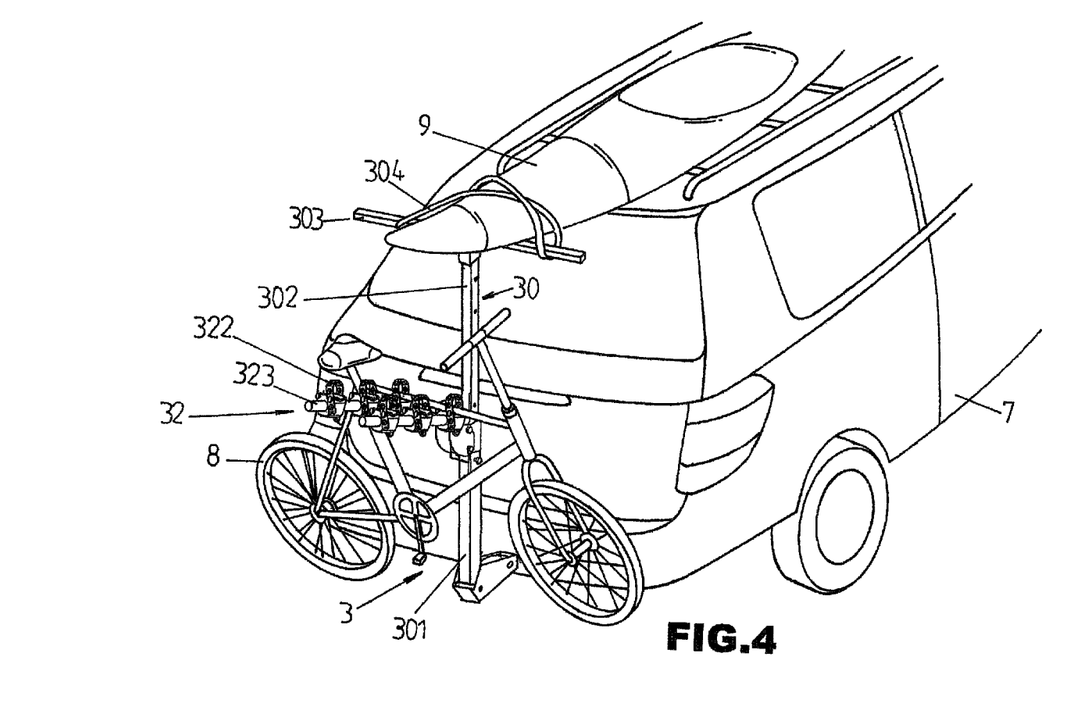
FIG. 4 is a schematic operational view of the carrying device as shown in FIG. 1 in use.

In operation, referring to FIG. 4 with reference to FIGS. 1-3, when the carrying device 3 is mounted on a car 7, the first support rack 30 is used to carry an elongate object 9, such as a surf board, a boat, a ladder and the like, and the second support rack 32 is used to carry a bicycle 8.

In such a manner, when a user wishes to carry the elongate object 9, the transverse bar 303 of the first support rack 30 is expanded, and the inner tube 302 of the first support rack 30 is movable relative to the outer tube 301 of the first support rack 30 by releasing the adjusting pin 6 until the transverse bar 303 of the first support rack 30 reaches the top of the car 7 so that the first support rack 30 is expanded. Then, the inner tube 302 of the first support rack 30 is locked onto the outer tube 301 of the first support rack 30 by the adjusting pin 6. Thus, when the elongate object 9 is placed on the first support rack 30, the elongate object 9 is supported by the transverse bar 303 of the first support rack 30 and the top of the car 7 and is positioned by the fixing cord 304 of the first support rack 30 so that the elongate object 9 is attached to the first support rack 30 and is carried by the car 7.

In addition, the linking member 320 of the second support rack 32 is positioned on the connecting member 31 by the pivot bolt 4 and the positioning pin 5 to lock the second support rack 32 onto the connecting member 31 so that the second support rack 32 is expanded, and the support bar 323 of the second support rack 32 is located at a horizontal state. Thus, when the bicycle 8 is placed on the support bar 323 of the second support rack 32, the bicycle 8 is supported by the mounting brackets 321 of the second support rack 32 and is positioned by the fastening straps 322 of the second support rack 32 so that the bicycle 8 is attached to the second support rack 32 and is carried by the car 7.

Figure 5:
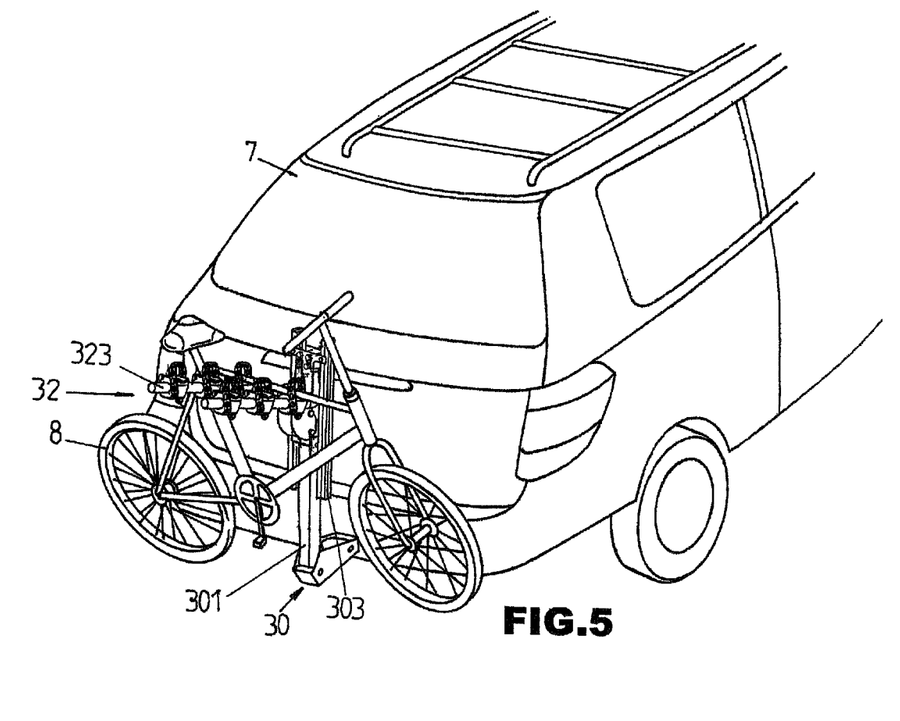
FIG. 5 is another schematic operational view of the carrying device as shown in FIG. 1 in use.

Alternatively, referring to FIG. 5 with reference to FIGS. 1-3, the first support rack 30 is folded, and the second support rack 32 is expanded, so that only the bicycle 8 is attached to the second support rack 32 and is carried by the car 7.

Figure 6:
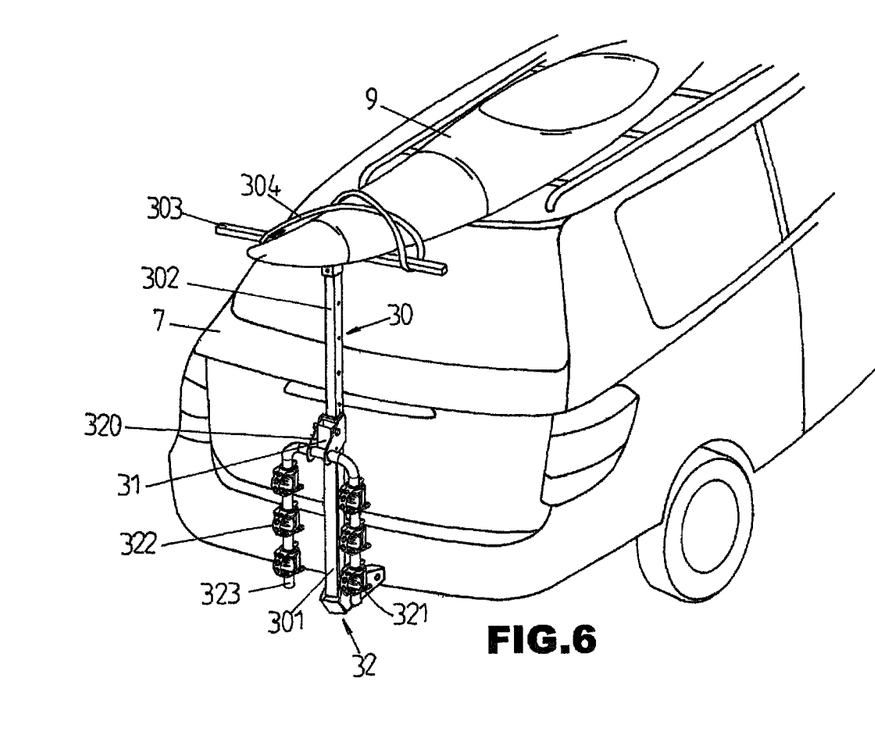
FIG. 6 is another schematic operational view of the carrying device as shown in FIG. 1 in use.

Alternatively, referring to FIG. 6 with reference to FIGS. 1-3, the first support rack 30 is expanded, and the second support rack 32 is folded, so that only the elongate object 9 is attached to the first support rack 30 and is carried by the car 7.

Figure 7:
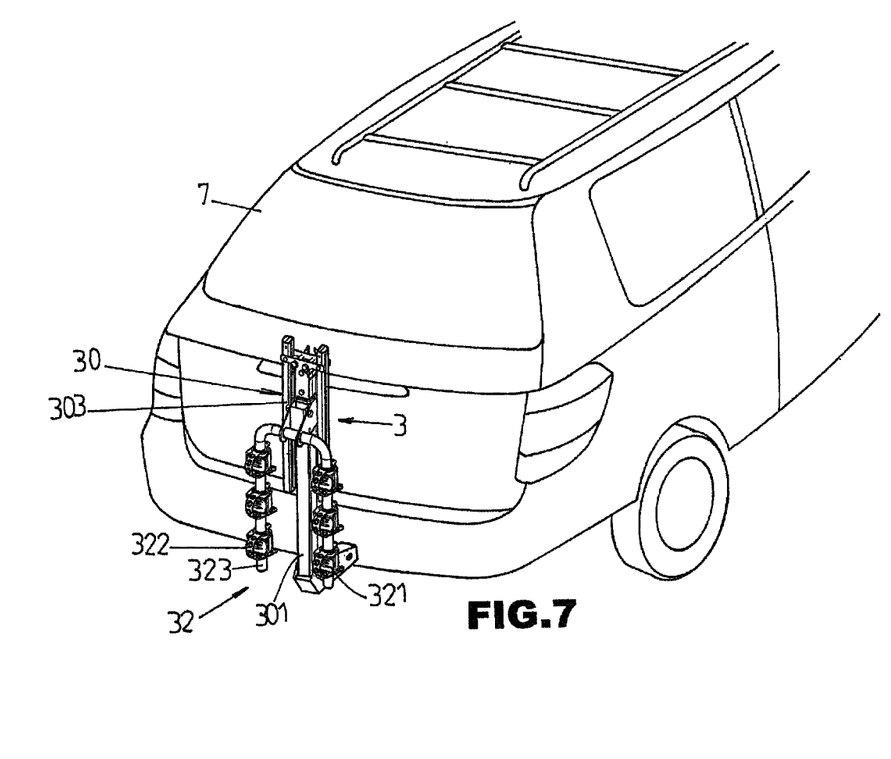
FIG. 7 is another schematic operational view of the carrying device as shown in FIG. 1 in use.

Alternatively, referring to FIG. 7 with reference to FIGS. 1-3, both the first support rack 30 and the second support rack 32 are folded.

Figure 8:
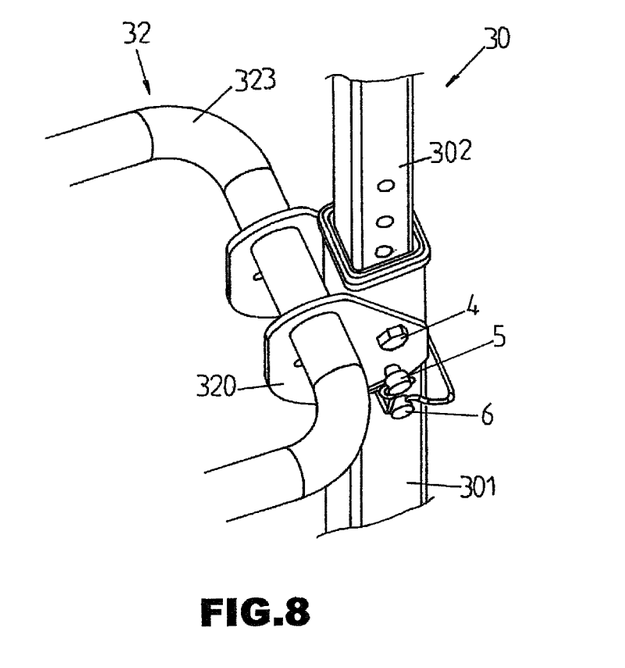
FIG. 8 is a partially perspective view of a carrying device in accordance with another preferred embodiment of the present invention.

Referring to FIG. 8 with reference to FIGS. 1-3, the linking member 320 of the second support rack 32 is directly mounted on the outer tube 301 of the first support rack 30. The second support rack 32 further includes a pivot bolt 4 extended through the linking member 320 of the second support rack 32, the outer tube 301 of the first support rack 30 and the inner tube 302 of the first support rack 30 so that the linking member 320 of the second support rack 32 is pivotally connected with the outer tube 301 of the first support rack 30, and a positioning pin 5 extended through the linking member 320 of the second support rack 32, the outer tube 301 of the first support rack 30 and the inner tube 302 of the first support rack 30 so that the linking member 320 of the second support rack 32 is positioned on the outer tube 301 of the first support rack 30 by the pivot bolt 4 and the positioning pin 5 to lock the second support rack 32 onto the first support rack 30.

Figure 9:
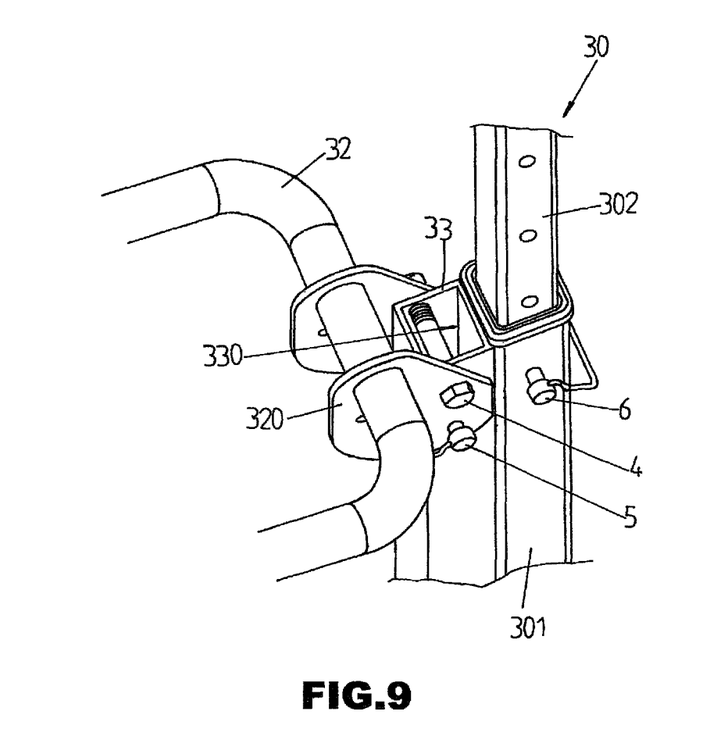
FIG. 9 is a partially perspective view of a carrying device in accordance with another preferred embodiment of the present invention.

Referring to FIG. 9 with reference to FIGS. 1-3, the connecting member 33 is a substantially rectangular hollow post which has a length equal to that of the outer tube 301 of the first support rack 30. The connecting member 33 is juxtaposed to and secured on a side of the outer tube 301 of the first support rack 30 by soldering and has an interior provided with a space 330. The pivot bolt 4 passes through the space 330 of the connecting member 33. The positioning pin 5 passes through the space 330 of the connecting member 33.

Accordingly, the first support rack 30 is used to carry an elongate object 9, such as a surf board, a boat, a ladder and the like, and the second support rack 32 is used to carry a bicycle 8, thereby enhancing the versatility of the carrying device 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A carrying device comprising:
a first support rack;
a second support rack pivotally connected with the first support rack; and
a connecting member secured on the first support rack and pivotally connected with the second support rack to connect the first support rack and the second support rack, wherein:
the first support rack includes:
an outer tube;
an inner tube retractably mounted in the outer tube; and
an adjusting pin extended through the outer tube and adjustably locked onto the inner tube;
the second support rack includes:
a support bar; and
at least one linking member mounted on the support bar;
the connecting member is secured on the outer tube of the first support rack;

the linking member of the second support rack is pivotally mounted on the connecting member;

the second support rack further includes:

a pivot bolt extended through the linking member of the second support rack and the connecting member with the linking member of the second support rack pivotally connected with the connecting member; and a positioning pin extended through the linking member of the second support rack and the connecting member with the linking member of the second support rack positioned on the connecting member by the pivot bolt and the positioning pin to lock the second support rack onto the connecting member; and the connecting member is a substantially rectangular hollow post.

2. The carrying device of claim 1, wherein the connecting member has a length equal to that of the outer tube of the first support rack.

3. The carrying device of claim 1, wherein the connecting member is juxtaposed to and secured on a side of the outer tube of the first support rack.

4. The carrying device of claim 1, wherein:

the connecting member has an interior provided with a space;

the pivot bolt passes through the space of the connecting member; and the positioning pin passes through the space of the connecting member.

5. The carrying device of claim 1, wherein:

the connecting member has an interior provided with a space which is confined between the connecting member and the outer tube of the first support rack;

the pivot bolt passes through the space of the connecting member; and the positioning pin passes through the space of the connecting member.

6. The carrying device of claim 5, wherein the connecting member has a substantially U-shaped profile.

7. The carrying device of claim 6, wherein the connecting member has two opposite sides abutting two opposite sides of a top of the outer tube of the first support rack.

* * * * *